(12) United States Patent
Shimamoto et al.

(10) Patent No.: US 10,949,138 B2
(45) Date of Patent: Mar. 16, 2021

(54) IMAGE PROCESSING APPARATUS RESOLVING MEMORY SHORTAGE

(71) Applicant: KYOCERA Document Solutions Inc., Osaka (JP)

(72) Inventors: Kunihiko Shimamoto, Osaka (JP); Akihiko Ikazaki, Osaka (JP); Shinichi Hashimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/662,668

(22) Filed: Oct. 24, 2019

(65) Prior Publication Data

US 2020/0142644 A1 May 7, 2020

(30) Foreign Application Priority Data

Nov. 2, 2018 (JP) .............................. JP2018-207625

(51) Int. Cl.
*G06F 3/12* (2006.01)
*H04N 1/32* (2006.01)

(52) U.S. Cl.
CPC .............. *G06F 3/122* (2013.01); *G06F 3/121* (2013.01); *H04N 1/32448* (2013.01); *H04N 2201/001* (2013.01); *H04N 2201/0094* (2013.01)

(58) Field of Classification Search
CPC ........ G06F 3/122; G06F 3/121; G06F 9/5022; H04N 1/32448; H04N 2201/001; H04N 2201/0094; G06K 15/40
See application file for complete search history.

(56) References Cited

U.S. PATENT DOCUMENTS

| 5,663,805 | A | * | 9/1997 | Asai | .................. | H04N 1/32363 |
| | | | | | | 358/404 |
| 2012/0124320 | A1 | * | 5/2012 | Kato | ..................... | G06F 9/5022 |
| | | | | | | 711/170 |
| 2015/0134892 | A1 | * | 5/2015 | Goda | ....................... | H04N 1/21 |
| | | | | | | 711/103 |
| 2019/0370069 | A1 | * | 12/2019 | Swadling | .............. | G06F 9/4451 |
| 2020/0042338 | A1 | * | 2/2020 | Poothia | ................. | G06F 3/0604 |

FOREIGN PATENT DOCUMENTS

| JP | H06-75848 A | 3/1994 |
| JP | H09-55853 A | 2/1997 |

* cited by examiner

*Primary Examiner* — Iriana Cruz
(74) *Attorney, Agent, or Firm* — IP Business Solutions, LLC (57) ABSTRACT

An image processing apparatus has a plurality of image processing functions, executes processing based on an OS as an operation system, and includes an OS memory and a control device. The control device functions as an allocating device, a determination device, and a release device. The allocating device allocates, on the OS memory, image processing memories used for image processing, for the image processing functions, respectively. The determination device determines, based on respective past usage statuses of the image processing memories allocated for each of the image processing functions, regions unlikely to be used, of the image processing memories. The release device, upon occurring memory shortage in the OS memory, releases the regions of the image processing memories determined by the determination device to resolve the memory shortage.

5 Claims, 7 Drawing Sheets

IMAGE PROCESSING APPARATUS RESOLVING MEMORY SHORTAGE

INCORPORATION BY REFERENCE

This application claims priority to Japanese Patent Application No. 2018-207625 filed on Nov. 2, 2018, the entire contents of which are incorporated by reference herein.

BACKGROUND

This disclosure relates to a technology for resolving memory shortage.

In response to an increase in the number of functions included in image processing apparatuses such as multifunction peripherals in recent years, not only an image processing memory used in image processing but also the capacity of an operating system (hereinafter referred to as OS) memory used by the OS has been increasing.

SUMMARY

As one aspect of this disclosure, a technology obtained by improving the technology described above will be suggested.

An image processing apparatus according to one aspect of this disclosure has a plurality of image processing functions and executes processing based on an OS as an operation system, and the image processing apparatus includes an OS memory and a control device. The OS memory is used by the OS. The control device includes a processor and, as a result of executing a control program by the processor, functions as an allocating device, a determination device, and a release device. The allocating device allocates, on the OS memory, image processing memories used for image processing, for the image processing functions, respectively. The determination device determines, based on respective past usage statuses of the image processing memories allocated for each of the image processing functions, regions unlikely to be used, of the image processing memories. The release device, upon occurring memory shortage in the OS memory, releases the regions of the image processing memories determined by the determination device to resolve the memory shortage.

DETAILED DESCRIPTION

Figure 1:
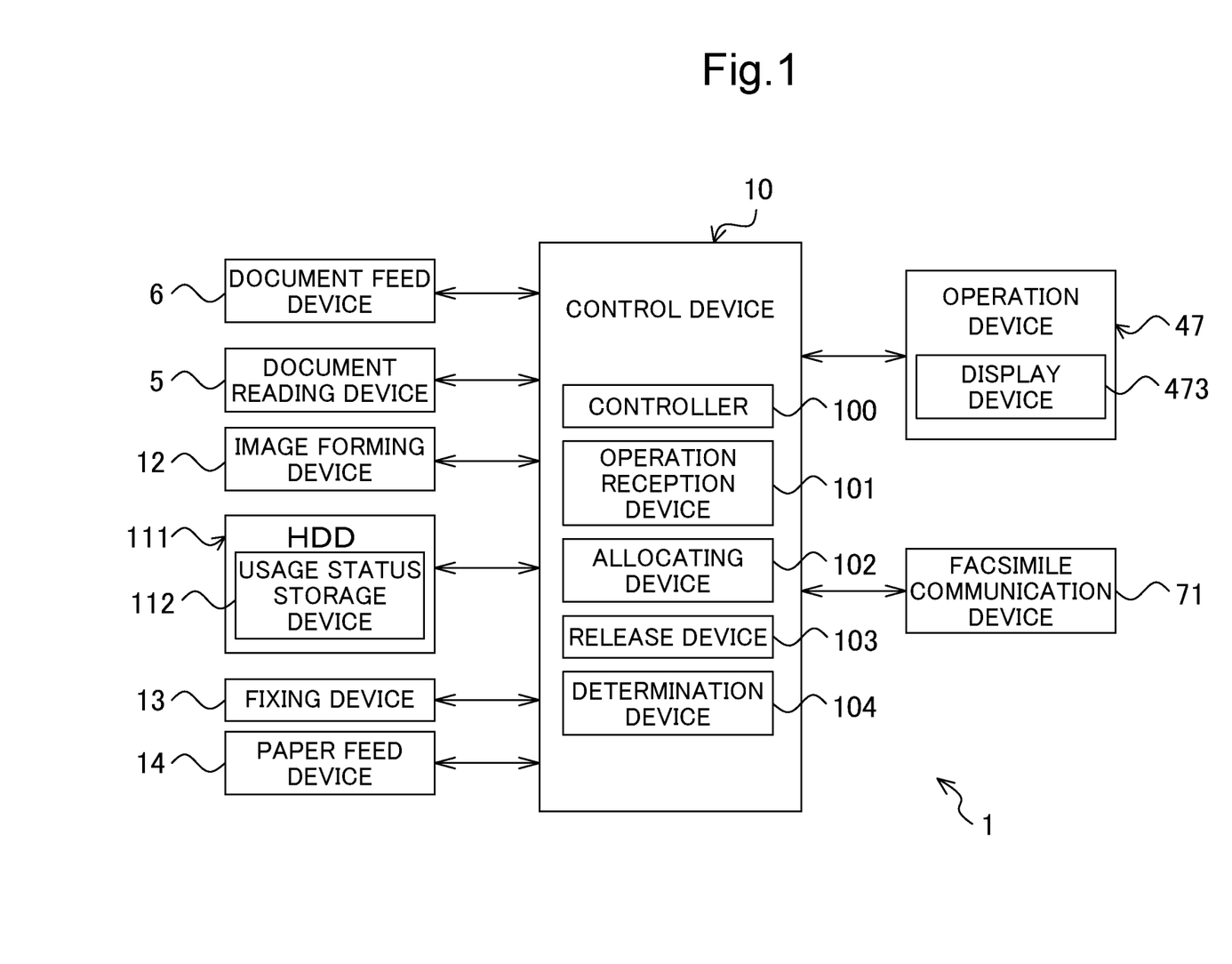
FIG. 1 is a functional block diagram schematically illustrating a main inner configuration of an image forming apparatus as one embodiment of an image processing apparatus according to this disclosure.

Hereinafter, an image processing apparatus according to this disclosure will be described with reference to the drawings. FIG. 1 is a functional block diagram schematically illustrating a main inner configuration of an image forming apparatus as one embodiment of the image processing apparatus according to this disclosure.

An image forming apparatus 1 according to a first embodiment is a multifunction peripheral combining together a plurality of image processing functions such as, for example, a scanner function, a print function, a facsimile function, and a raster image processor (RIP) function. The image forming apparatus 1 includes: a control device 10, a document feed device 6, a document reading device 5, an image forming device 12, a hard disk drive (HDD) 111, a fixing device 13, a paper feed device 14, an operation device 47, and a facsimile communication device 71.

A case where document reading operation is performed in the image forming apparatus 1 will be described. The document reading device 5 optically reads an image of a document conveyed by the document feed device 6 or a document loaded on contact glass, not illustrated, to generate image data. The image data generated by the document reading device 5 is saved into an image memory, not illustrated, or the like.

A case where image forming operation is performed in the image forming apparatus 1 will be described. Based on, for example, the image data generated through the document reading operation or image data received from a computer serving as a network-connected external device, not illustrated, the image forming device 12 forms a toner image on recording paper as a recording medium fed from the paper feed device 14.

The HDD 111 is a large-capacity storage device and includes a usage status storage device 112. The usage status storage device 112 will be described later on.

The fixing device 13 heats and pressurizes the recording paper on which the toner image has been formed by the image forming device 12 to thereby fix the toner image onto the recording paper. The recording paper subjected to the fixing processing is discharged onto a discharge tray, not illustrated. The paper feed device 14 includes a paper feed cassette.

The operation device 47 receives instructions, such as image formation operation execution instruction, for various types of operation and processing executable by the image forming apparatus 1 from an operator. The operation device 47 includes a display device 473 which displays, for example, an operation guide to an operator.

The display device 473 has a touch panel function so that an operator can touch a button or a key displayed on a screen to operate the image forming apparatus 1.

The facsimile communication device 71 includes an encoding-decoding and a modulation-demodulation device and a network control unit (NCU), and performs facsimile transmission and reception by use of, for example, a public telephone line network.

The control device 10 is configured to include: a processor which executes processing based on an operating system (OS), a random access memory (RAM), a read only memory (ROM), and a dedicated hardware circuit. The processor is, for example, a central processing unit (CPU), an application specific integrated circuit (ASIC), or a micro processing unit (MPU). The control device 10 includes: a controller 100, an operation reception device 101, an allocating device 102, a release device 103, and a determination device 104. Note that the RAM forming the control device 10 is one example of an OS memory in the scope of the claims. An OS memory M1 (see FIG. 2) is a memory used by an OS.

The control device 10 functions as the controller 100, the operation reception device 101, the allocating device 102, the release device 103, and the determination device 104 through operation performed in accordance with control programs stored in the HDD 111 by the aforementioned processor. Note that, however, it is possible to form each of the controller 100, etc. by a hardware circuit without depending on the operation performed in accordance with the control programs by the control device 10. Hereinafter, the same applies to the embodiments unless otherwise is specified.

The controller 100 is in charge of overall operation control of the image forming apparatus 1. The controller 100 is connected to the document feed device 6, the document reading device 5, the image forming device 12, the HDD 111, the fixing device 13, the paper feed device 14, the operation device 47, and the facsimile communication device 71 to perform, for example, driving control of the aforementioned devices.

The operation reception device 101 receives operation input from a user via the operation device 47. The operation reception device 101 receives user operation on a hard key included in the operation device 47 and further receives, by the touch panel function included in the display device 473, instructions inputted through user operation on an operation screen displayed at the display device 473. For example, the controller 100 executes the various types of processing belonging to image processing functions in accordance with the user instruction received by the operation reception device 101.

Figure 2:
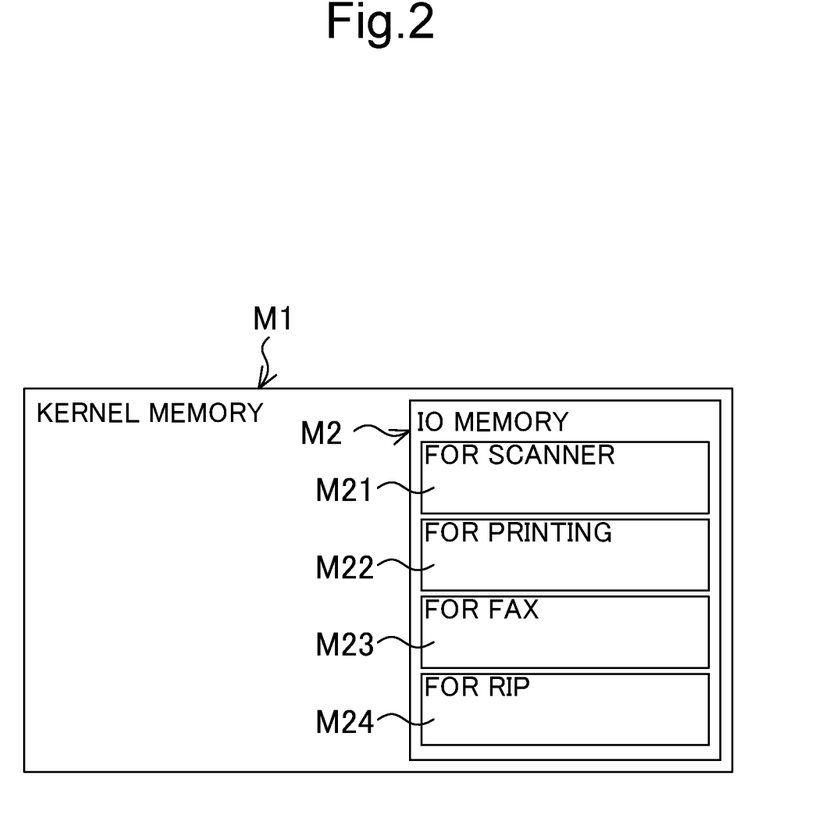
FIG. 2 is a diagram schematically illustrating one example of an inner state of an OS memory.

The allocating device 102 allocates, on the OS memory M1 (a Kernel memory in the figure), an image processing memory M2 (an IO memory in the figure) used for the image processing, as illustrated in FIG. 2, upon start of the image forming apparatus 1. Image processing memories M21 to M24 are respectively allocated for a scanner, for printing, for facsimile (FAX), and for RIP.

To show high processing performance in the image processing, it is required to store image data used for the image processing into physically continuous memory regions. That is, it is also required to allocate physically continuous memory regions for the image processing memories M21 to M24.

Once the OS memory M1 starts to be used, it is difficult to allocate the physically continuous memory regions of a fixed size or more on the OS memory M1. Thus, the image processing memories M21 to M24 are allocated by the allocating device 102 upon the start of the image forming apparatus 1.

Moreover, respective usage statues of the image processing memories M21 to M24 are monitored by the controller 100, which stores, into the usage status storage device 112, usage status information indicating the aforementioned usage statuses.

Upon occurring memory shortage in the OS memory M1, the release device 103 releases regions unlikely to be used, of the image processing memory M2, to resolve the memory shortage in the OS memory M1. More specifically, the release device 103 releases the regions of the image processing memory M2 determined by the determination device 104, which will be described later on.

The region allocated as the image processing memory M2 cannot be used as part of the OS memory M1 but is allocated on the OS memory M1 and thus can be used as an extended region of the OS memory M1 when released from the image processing memory M2.

Note that it is possible to judge, for example, based on free capacity of the OS memory M1, whether or not any memory shortage is occurring in the OS memory M1. The controller 100 monitors the free capacity of the OS memory M1 and upon judging that the free capacity is equal to or less than a predefined threshold value, judges that memory shortage is occurring. At this point, the release device 103 performs the aforementioned release. Moreover, upon occurrence of an error attributable to the memory shortage in the OS memory M1, the release device 103 may perform the aforementioned release in response to the error.

Based on respective past usage statuses of the image processing memories M21 to M24 allocated to the respective image forming functions, the determination device 104 determines the regions unlikely to be used, of the image processing memory M2 (that is, the regions of the image processing memory M2 which will be released upon occurrence of memory shortage in the OS memory M1). Here stated "Past" includes a period before a current time point, i.e., a period from a predefined time point before the current time point until the current time point.

For example, based on respective past usage frequencies and usage amounts of the image processing memories M21 to M24 which are indicated by the usage status information stored in the usage status storage device 112, the determination device 104 determines, from the unlikeliness of usage as well as the low past usage amount, the aforementioned regions (that is, the regions unlikely to be used, of the image processing memory M2) and also sets priorities for releasing the regions.

<Region Determination and Priority Setting Method (1)>

When, among the image processing memories M21 to M24, there is at least one memory that has never been used up to its maximum capacity in past, the determination device 104 determines, as the at least one region to be released, a region never been used even once in the past (the region being within the at least one memory), and provides a highest priority for the release.

Detailed Example 1 of Region Determination and Priority Setting Method (1)

When the image processing memories M21, M23, and M24 have been used up to respective maximum capacities in the past while the image processing memory M22 (for printing) has been used only up to 50% of its maximum capacity, the determination device 104 determines, as the region to be released, the remaining 50% region of the image processing memory M22 which has never been used even once in the past and provides a highest priority for the release.

Detailed Example 2 of Region Determination and Priority Setting Method (1)

When the image processing memories M22 and M24 have been used up to respective maximum capacities in the past while the image processing memory M21 (for scanner) has never been used in the past (that is, 0% usage at most) and the image processing memory M22 (for printing) has been used up to 50% of its maximum capacity in the past, the determination device 104 determines, as regions to be released, the regions of the image processing memories M21 and M22. The determination device 104 provides the highest priority to the region of the image processing memory M21.

However, when the entire region of the image processing memory M21 is released, the scanner function cannot be used at all, leading to a risk that any inconvenience will occur. Therefore, the determination device 104 preferably determines the region to be released so as to leave predefined memory capacity for performing standard processing (for example, processing of monochromatically reading A4 paper with standard resolution). To realize this, an upper value of the released region is previously obtained through calculation and set in the determination device 104.

Similarly, when the standard processing can no longer be performed as a result of releasing the entire 50% region of the image processing memory M22, the determination device 104 preferably determines a region to be released so as to leave memory capacity with which the standard processing can be performed.

<Region Determination and Priority Setting Method (2)>

When none of the image processing memories M21 to M24 has been used up to respective maximum capacities in the past, the determination device 104 determines, as the regions to be released, a region, in each of the image processing memories M21 to M24, which has never been used even once. Then the determination device 104 increases the aforementioned priority of the region belonging to the memory with the low usage frequency.

Detailed Example of Region Determination and Priority Setting Method (2)

When the image processing memories M21 to M24 have been used up to 90%, 70%, 80%, and 60%, respectively, at most in the past, the determination device 104 determines, as regions to be released, remaining 10%, 30%, 20%, and 40%, respectively, of the regions of the image processing memories M21 to M24.

Then when the usage frequencies are high in order of for RIP, for FAX, for scanner, and for printing, the determination device 104 determines, in descending order of the aforementioned priorities, the 30% region of the image processing memory M22 (for printing), the 10% region of the image processing memory M21 (for scanner), the 20% region of the image processing memory M23 (for FAX), and the 40% region of the image processing memory M24 (for RIP).

<Region Determination and Priority Setting Method (3)>

When all of the image processing memories M21 to M24 have been used up to respective maximum capacities in the past, the determination device 104 determines, as the regions to be released, a region, among the image processing memories M21 to M24, whose usage frequency is equal to or less than a predetermined ratio. Then the aforementioned priority of the region belonging to the memory with the low usage frequency is increased.

Detailed Example of Region Determination and Priority Setting Method (3)

When all the image processing memories M21 to M24 have been used up to respective maximum capacities in the past and in the image processing memories M21 to M24, the regions whose usage frequency are equal to or less than the predefined ratio are 40%, 20%, 10%, and 40%, respectively, the determination device 104 determines these regions as regions to be released.

Then when the usage frequencies are high in order of for RIP, for FAX, for scanner, and for printing, the determination device 104 provides, in descending order of the aforementioned priorities, the 20% region of the image processing memory M22 (for printing), the 40% region of the image processing memory M21 (for scanner), the 10% region of the image processing memory M23 (for FAX), and the 40% region of the image processing memory M24 (for RIP).

Figure 3:
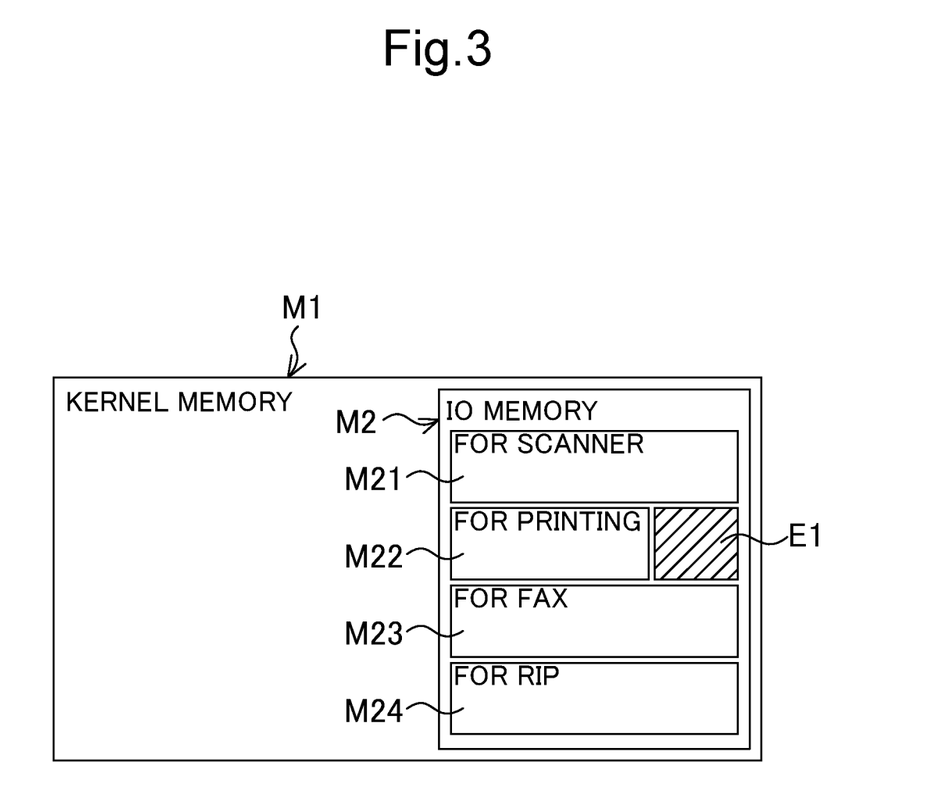
FIG. 3 is a diagram schematically illustrating one example of an inner state of the OS memory.
Figure 4A:
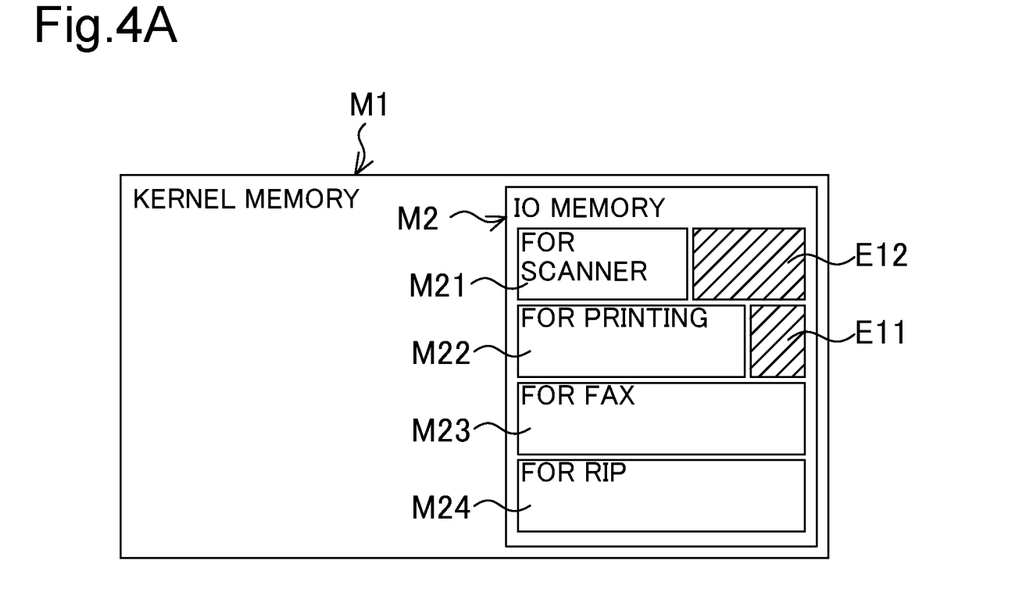
FIGS. 4A and 4B are diagrams each schematically illustrating one example of an inner state of the OS memory.
Figure 4B:
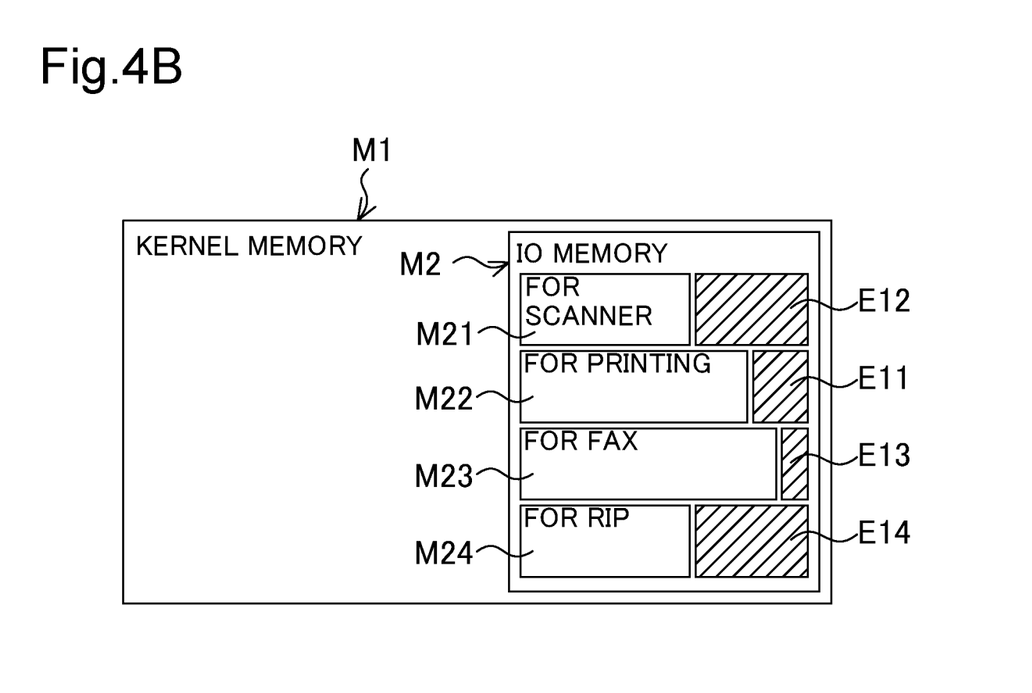

FIGS. 3, 4A, and 4B are diagrams each illustrating one example of a state in which part of the region of the image processing memory M2 is released. FIG. 3 illustrates the state in which the 30% region E1 of the image processing memory M22 (for printing) with the highest priority is released, which is illustrated in <Detailed Example of Region Determination and Priority Setting Method (2)>.

FIG. 4A illustrates the state in which the 20% region E11 of the image processing memory M22 (for printing) with the highest priority and the 40% region E12 of the image processing memory M21 (for scanner) with the second highest priority are released by the release device 103, which are illustrated in <Detailed Example of Region Determination and Priority Setting Method (3)>.

FIG. 4B illustrates the state in which the 10% region E13 of the image processing memory M23 (for FAX) and the 40% region E14 of the image processing memory M24 (for RIP) are further released by the release device 103 as a result of failure to resolve the memory shortage in the OS memory M1 only through the release of the regions E11 and E12.

Figure 5:
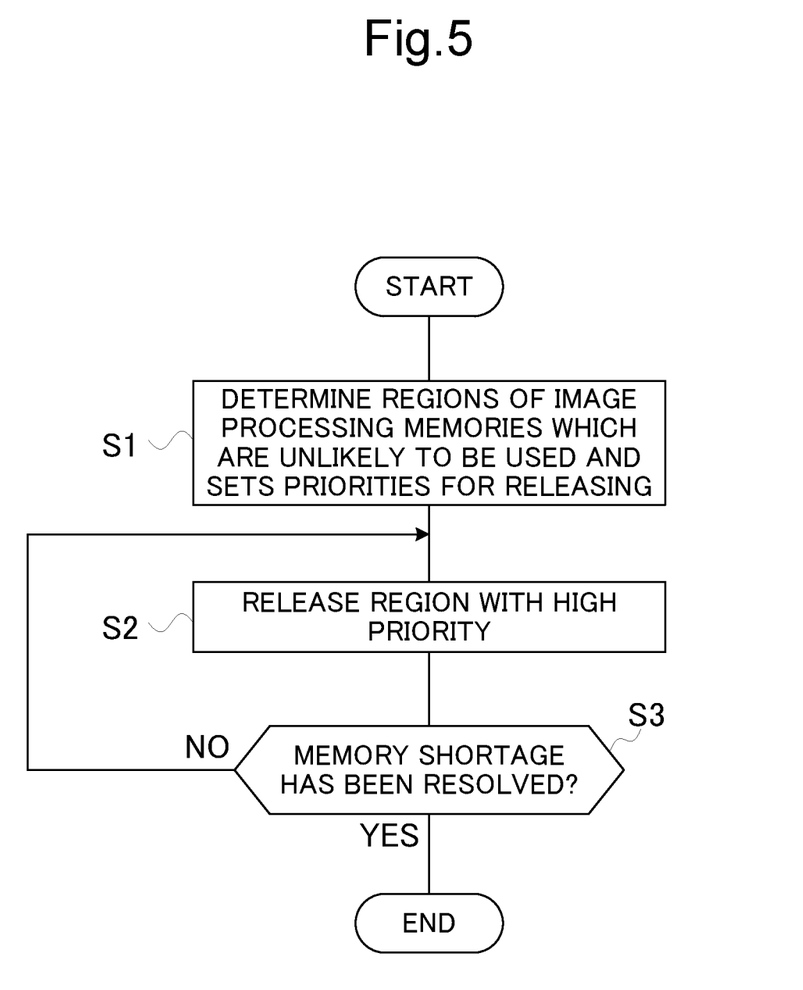
FIG. 5 is a flowchart illustrating one example of processing operation performed in a control device of the image forming apparatus according to a first embodiment.

Next, one example of processing operation performed in the control device 10 of the image forming apparatus 1 according to the first embodiment will be described based on a flowchart illustrated in FIG. 5. Note that the processing operation is performed at a time point at which the controller 100 determines that the memory shortage is occurring in the OS memory M1.

Upon determining by the controller 100 that the memory shortage is occurring in the OS memory M1, the determination device 104, in response to the aforementioned determination, determines regions unlikely to be used, of the image processing memory M2 (that is, the regions to be released, of the image processing memory M2) based on the respective past usage statuses of the image processing memories M21 to M24 and sets priorities for releasing the aforementioned regions (S1), and the release device 103 releases the regions of the image processing memory M2 determined by the determination device 104 in descending order of the priorities (S2). Only the region with the highest priority is released here.

Subsequently, the controller 100 judges whether or not the memory shortage in the OS memory M1 has been resolved (S3), and upon judging by the controller 100 that the memory shortage has been resolved (YES in S3), the processing operation ends.

On the other hand, upon judging by the controller 100 that the memory shortage has not been resolved (NO in S3), the processing returns to S2 where the release device 103 releases the region of the image processing memory M2 with the second highest priority which has been determined by the determination device 104 (S2).

According to the first embodiment described above, upon occurrence of the memory shortage in the OS memory M1, the regions of the image processing memory M2 are released. Since the image processing memory M2 is allocated on the OS memory M1, the released regions of the image processing memory M2 can be used as part of the OS memory M1. That is, the OS memory M1 is expanded, thus making it possible to resolve the memory shortage in the OS memory M1.

However, for an image processing memory, the memory capacity required when the memory is used up to a maximum is prepared based on assumed maximum usage in many cases. Thus, memory shortage hardly occurs in the image processing memory. For example, prepared in an image processing memory assigned to a scanner function in a multifunction peripheral compatible with A3 paper is memory capacity required when A3 paper all over which an image is drawn is read with maximum resolution and in color.

However, for the OS memory, simultaneous execution of the various programs leads to a risk of occurrence of memory shortage which may adversely affect the execution of the programs.

For example, there is still no allocating method for allocating a new memory when the image processing memory has become short and also when the OS memory has become short. Moreover, a typical buffer memory management method cannot support cases where the memory shortage occurs.

On the contrary, the memory shortage in the OS memory can be resolved in this embodiment.

The released regions of the image processing memory M2 can no longer be used for the image processing, but the released regions of the image processing memory M2 are regions which are unlikely to be used, for example, regions which have never been used even once in the past. Therefore, it is possible to resolve the memory shortage in the OS memory M1 while avoiding the danger such that inconvenience occurs in the image processing. Note that the image forming apparatus 1 needs to be restarted to restore the image processing memory M2 to a state before the release, as illustrated in FIG. 2.

However, upon releasing the regions of the image processing memory M2 by the release device 103, the execution of the various types of processing for the image processing functions may be limited. For example, releasing the region of the image processing memory M21 (for scanner) by 40% is assumed to result in failure to read large-sized paper (for example, A3 paper) with high resolution (for example, 600 dpi).

Figure 6:
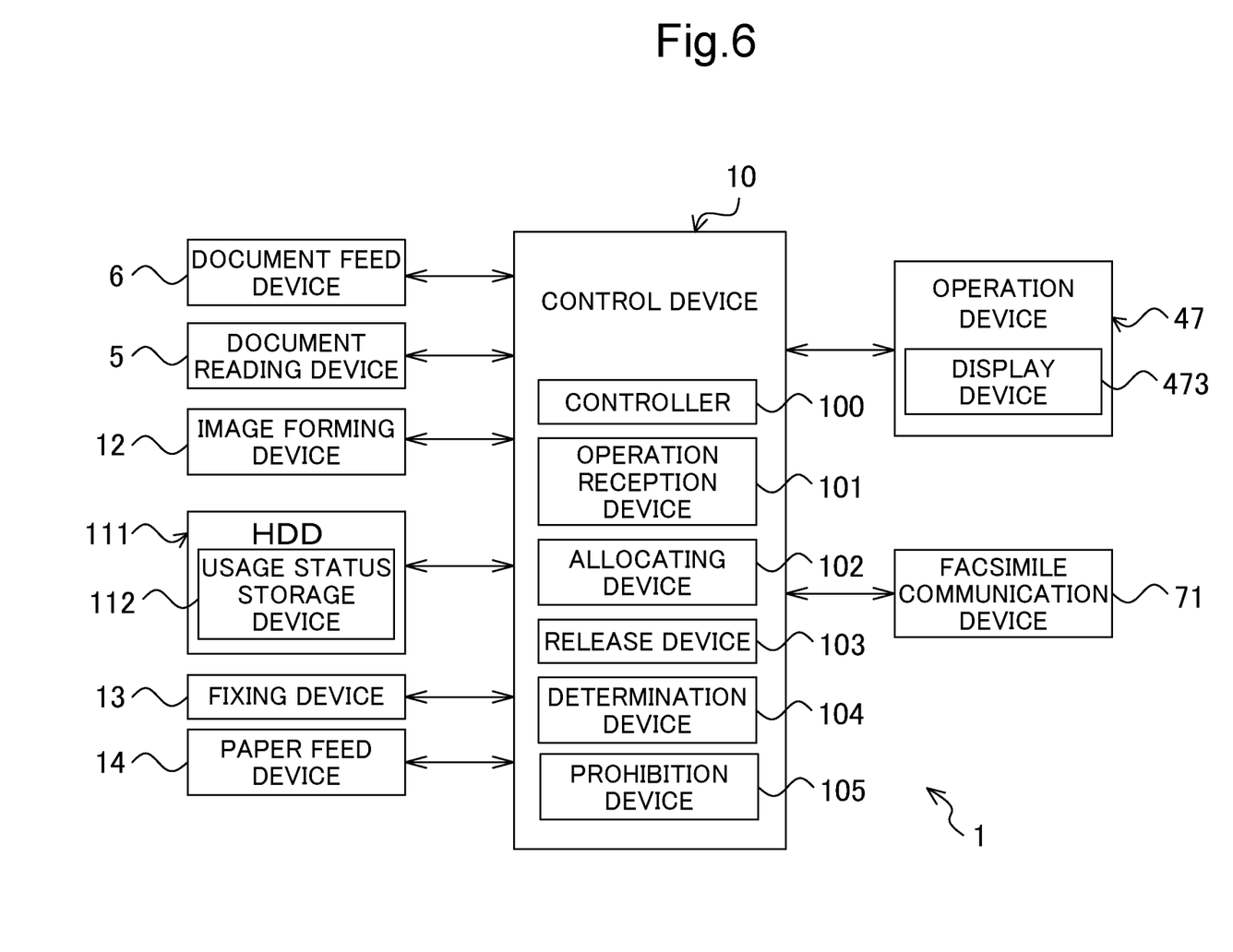
FIG. 6 is a functional block diagram schematically illustrating a main inner configuration of an image forming apparatus according to a second embodiment.

Thus, the control device 10 in the second embodiment includes, in addition to the configuration of the first embodiment, a prohibition device 105 which prohibits user setting for non-executable processing, as illustrated in FIG. 6.

The prohibition device 105 prohibits the user setting for the non-executable processing when the execution of the various types of processing belonging to the image processing functions have been restricted as a result of the release of the regions of the image processing memory M2 by the release device 103.

For example, through comparison between predefined memory capacity required for executing each of the various types of processing belonging to the image processing functions and the remaining non-released memory capacity of the image processing memory M2 assigned to the image processing function to which this processing belongs, the prohibition device 105 judges whether or not the aforementioned processing is executable, and prohibits the user setting for the processing which has been determined to be nonexecutable.

When the memory capacity required for the processing of reading A3 paper with a resolution of 600 dpi occupies 70% of the image processing memory M21 (for scanner) and 40% of the image processing memory M21 is released (that is, when only 60% is left) as illustrated in FIGS. 4A and 4B, the prohibition device 105 judges that the aforementioned processing is non-executable and prohibits acceptance of the user setting for the aforementioned processing. As a detailed example, when "A3" is set as a document size, the prohibition device 105 prohibits acceptance of user setting for the resolution of "600 dpi". Moreover, the prohibition device 105 may cause the display device 473 to display, in grey, an operation button for setting the resolution on the operation screen at "600 dpi" and notify the user of the status that the user setting cannot be done.

Note that upon receiving the user operation on the operation button displayed in grey by the operation reception device 101, the prohibition device 105 may cause the display device 473 to display a message such as "Memory for scanning is in shortage. Please turn off the power to restart", prompting the user to restart the image forming apparatus 1. As described above, the restart of the image forming apparatus 1 can return the image processing memory M2 to a state before the release, as illustrated in FIG. 2.

Moreover, as another embodiment, the prohibition device 105 may detect the processing executable with the remaining non-released memory capacity of each of the image processing memories M21 to M24, may judge, as the non-executable processing, the processing other than those not detected, and may prohibit the user setting for the aforementioned processing.

Figure 7:
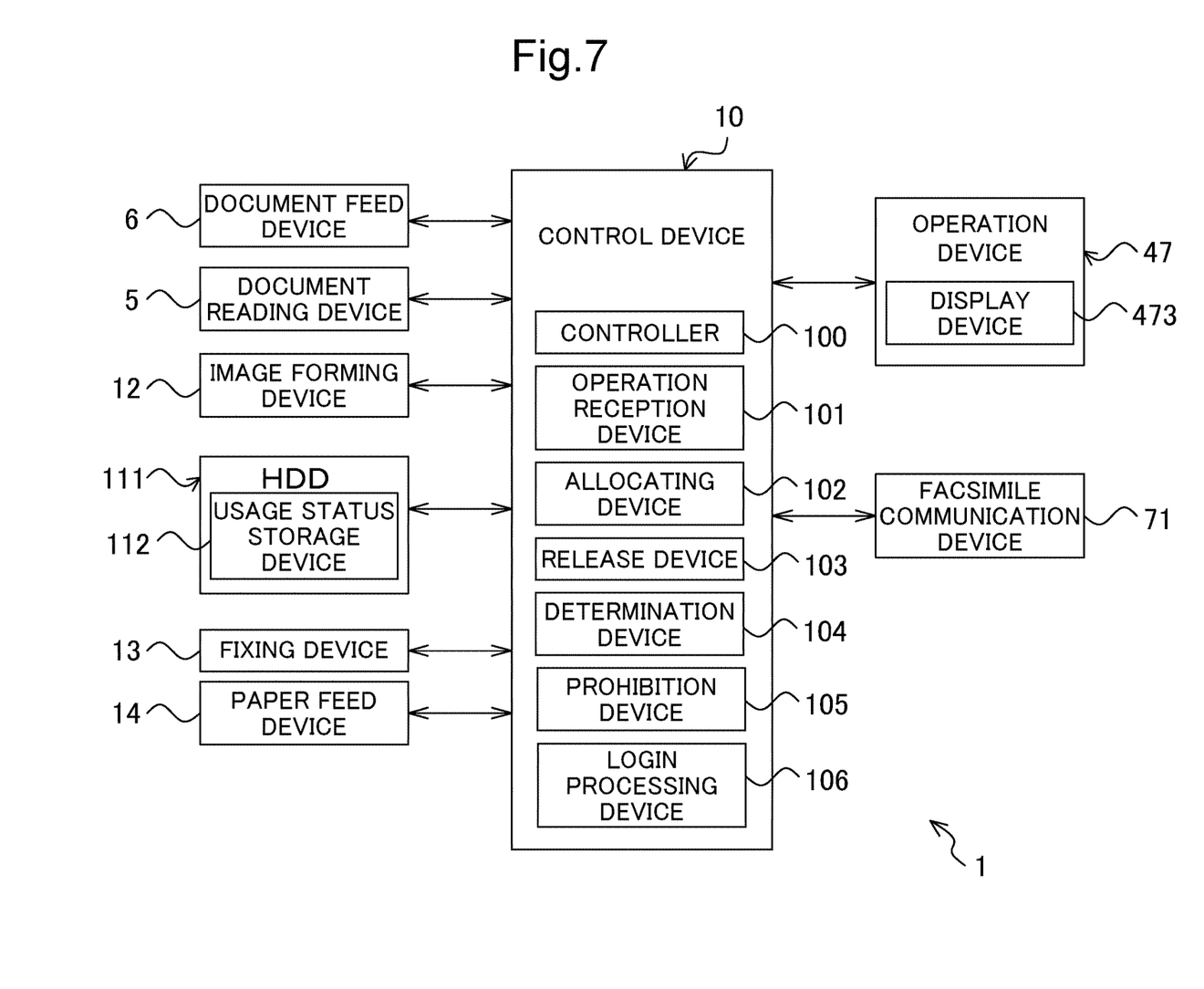
FIG. 7 is a functional block diagram schematically illustrating a main inner configuration of an image forming apparatus according to a third embodiment.

FIG. 7 is a functional block diagram schematically illustrating a main inner configuration of an image forming apparatus according to a third embodiment. The image forming apparatus according to the third embodiment is distinctive in a point that the control device 10 includes, in addition to the configuration of the image forming apparatus according to the first embodiment illustrated in FIG. 6, a login processing device 106 and also that the usage status storage device 112 stores, for each user, usage status information indicating respective usage statuses of the image processing memories M21 to M24.

Upon receiving login information inputted through user operation on the operation device 47 by the operation reception device 101, the login processing device 106 judges whether or not the inputted login information is proper, and upon judging that the aforementioned login information is proper, permits login of the aforementioned user in the image forming apparatus 1. At this point, the login processing device 106 specifies the user as an individual who is using the image forming apparatus 1. Note that the login processing device 106 is one example of an individual specification device in the scope of the claims.

The controller 100 monitors the respective usage statuses of the image processing memories M21 to M24, and stores, into the usage status storage device 112, the usage status information indicating the aforementioned usage statuses for each user specified by the login processing device 106.

The determination device 104 acquires the usage status information of the user specified by the login processing device 106 from the usage status storage device 112, and determines, from the respective past usage statues of the image processing memories M21 to M24 indicated by the acquired usage status information described above, the regions unlikely to be used, of the image processing memory M2.

According to the third embodiment, the regions unlikely to be used, of the image processing memory M2 are determined from the usage statuses of each user and the aforementioned regions are released, thus making it possible to remarkably reduce the possibility that any inconvenience occurs in the image processing.

This disclosure is not limited to the configuration of the embodiments described above and thus various modifications thereto are permitted. Moreover, the embodiments have been described above, referring to the multifunction peripheral as one embodiment of the image processing apparatus according to this disclosure. However, this is just one example, and an image forming apparatus having a copy function, a print function, and a scanner function may be provided as the image processing apparatus. Moreover, another image processing apparatus such as a computer or a mobile terminal device which performs image forming processing may be provided as one embodiment of the image processing apparatus according to this disclosure.

Moreover, the configuration and the processing illustrated by the embodiments described above with reference to FIGS. 1 through 7 form only one embodiment of this disclosure, and it is not intended to limit this disclosure to the aforementioned configuration and processing in any manner.

While the present disclosure has been described in detail with reference to the embodiments thereof, it would be apparent to those skilled in the art the various changes and modifications may be made therein within the scope defined by the appended claims.

What is claimed is:

1. An image processing apparatus having a plurality of image processing functions and executing processing based on an OS as an operation system,
   the image processing apparatus comprising:
      an OS memory used by the OS; and
      a control device including a processor and, as a result of executing a control program by the processor, functioning as:
         an allocating device allocating, on the OS memory, image processing memories used for image processing, for the image processing functions, respectively;
         a determination device determining, based on respective past usage statuses of the image processing memories allocated for each of the image processing functions, regions unlikely to be used, of the image processing memories; and
         a release device, upon occurring memory shortage in the OS memory, releasing the regions, of the regions of the image processing memories determined by the determination device to resolve the memory shortage,
      wherein, based on respective past usage frequencies and usage amounts of the image processing memories as the usage statuses, the determination device determines, from unlikeliness of usage and small usage amounts in the past, the regions unlikely to be used, of the image processing memories, and also sets priorities for releasing the regions, and
      the release device releases the regions in descending order of the priorities,
      (i) when, among each of the image processing memories, there is at least one memory that has never been used up to its maximum capacity in past, the determination device determines, as the at least one region to be released, a region never been used even once in the past, the region being within the at least one memory, and
      (ii) when all of the image processing memories have been used up to respective maximum capacities in the past, the determination device determines, as the regions to be released, a region, among each of the image processing memories, whose usage frequency is equal to or less than a predefined ratio.

2. The image processing apparatus according to claim 1, further comprising:
   a usage status storage device storing, for each user, usage status information indicating the respective usage statuses of the image processing memories, wherein
   as the result of executing the control program by the processor, the control device further functions as an individual specification device specifying a user as an individual who is using the image processing apparatus, and
   the determination device acquires, from the usage status storage device, the usage status information of the user specified by the individual specification device, and determines, based on the respective past usage statuses of the image processing memories indicated by the acquired usage status information, the regions unlikely to be used, of the image processing memories.

3. The image processing apparatus according to claim 1, wherein
   as the result of executing the control program by the processor, the control device further functions as a prohibition device prohibiting user setting for the non-executable processing when execution of various types of processing belonging to the image processing functions has been restricted as a result of releasing the regions of the image processing memories by the release device.

4. The image processing apparatus according to claim 1, wherein
   as the result of executing the control program by the processor, the control device further functions as a controller monitoring free capacity of the OS memory and upon judging that the free capacity is equal to or less than a predefined threshold value, judging that memory shortage is occurring in the OS memory, and
   upon judging by the controller that the memory shortage is occurring in the OS memory, the release device releases the regions of the image processing memories determined by the determination device to resolve the memory shortage.

5. The image processing apparatus according to claim 3, wherein
   through comparison between memory capacity required for executing each of the various types of processing belonging to the image processing functions and remaining non-released memory capacity as a result of not releasing the image processing memory assigned to the image processing function to which the aforementioned processing belongs, the prohibition device judges whether or not the processing is executable and prohibits user setting for the processing judged to be non-executable.

* * * * *